(No Model.)

O. F. MULHAUPT.
TRANSPLANTER.

No. 532,687. Patented Jan. 15, 1895.

United States Patent Office.

OTTO FREDERICK MULHAUPT, OF SHREVEPORT, LOUISIANA.

TRANSPLANTER.

SPECIFICATION forming part of Letters Patent No. 532,687, dated January 15, 1895.

Application filed February 13, 1894. Serial No. 500,031. (No model.)

*To all whom it may concern:*

Be it known that I, OTTO FREDERICK MULHAUPT, of Shreveport, in the parish of Caddo and State of Louisiana, have invented a new and Improved Transplanter, of which the following is a full, clear, and exact description.

My invention relates to a transplanter, and it has for its object to provide a receptacle in which small plants may be raised from the seed, and by means of which the small plants may be transferred to the ground without the necessity of removing the transplanter from around the plant, and to so construct the transplanter that the roots of the plant, when the transplanter is inserted in the ground, may enter the ground through the bottom of the transplanter and through the sides thereof if in practice it is found desirable.

A further object of the invention is to construct the transplanter of a material that is perishable, or subject to quick decay when placed in the ground.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1:
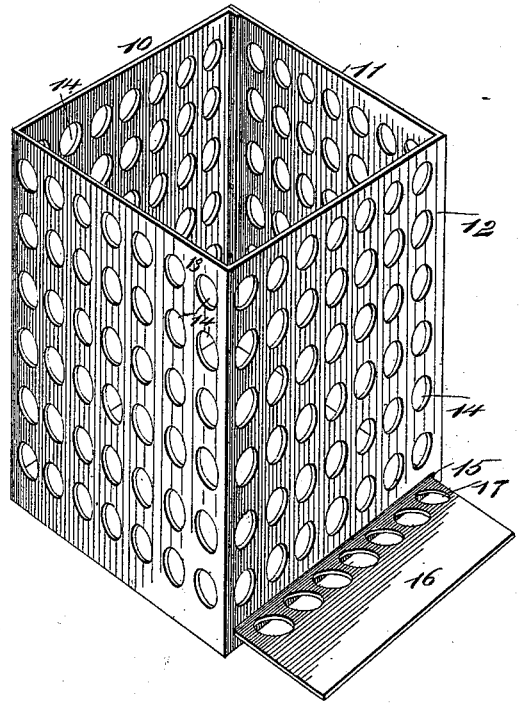
Figure 2:
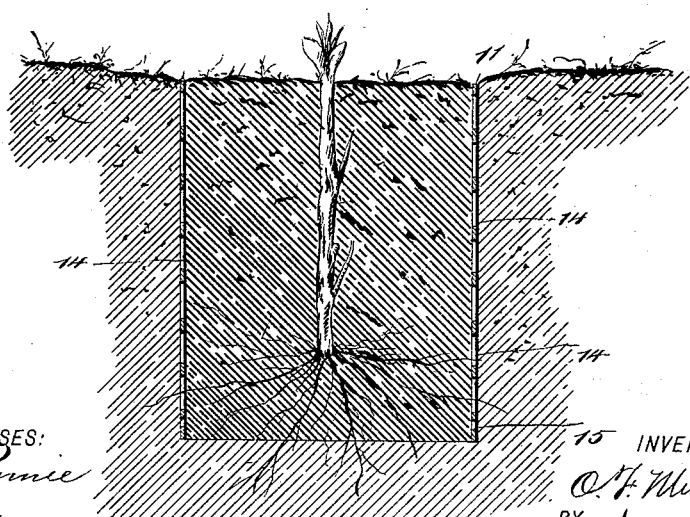

Figure 1 is a perspective view of the improved transplanter; and Fig. 2 is a vertical section thereof, illustrating the manner in which the plant is transferred to the ground through the medium of the transplanter.

In carrying out the invention the transplanter is constructed of perishable material, preferably very thin wood, whereby when the transplanter is placed in the ground it will quickly and effectually decay, and thus not retard the growth of the plant grown within it, or prevent moisture from reaching its roots.

The transplanter may be of any approved form, that shown in the drawings being made rectangular in general contour, comprising four connected sides 10, 11, 12 and 13, each of the sides being provided with series of apertures or openings 14, and one of the sides is provided near its bottom edge with a transverse slot or opening 15, into which the bottom 16 of the transplanter is inserted, and made preferably to pass through or enter a corresponding slot in the opposing side of the body. The bottom may be made of a different material from the body, or of the same material, and the said bottom is provided with a series of apertures or openings 17, whereby when the bottom is in position any water that may be poured upon the earth contained in the body may find its way out through the bottom of the transplanter.

In practice the transplanter is filled with suitable earth, the bottom being in position, and the seed is then planted in the earth. After the seed germinates and the plant appears and said plant gains a sufficient size for transplanting, the bottom is drawn from the transplanter, and the body of the transplanter, with its contents untouched or undisturbed, is buried in the ground as shown in Fig. 2, whereupon it will be readily understood that the roots of the plant may enter the ground through the open bottom of the transplanter, and also that the roots may find an exit from the transplanter through the openings in its side surfaces.

The invention is especially adapted for use in starting and raising early vegetables. When early spring arrives the transplanters are filled with rich earth and the seeds of delicate plants are sowed therein and placed in hot-houses, there to germinate. When all danger of frost is past, these transplanters are transferred to the garden where the ground is prepared to receive them, and as heretofore stated, the transplanters, with their plants, are set in the ground.

The advantages of setting the transplanters and the plants together in the ground are that the roots of the plants are not disturbed, and the growth of a plant is not retarded; and furthermore, a transplanter and plant may be set out at any time after all danger of frost is over, regardless of rain.

Another special feature, and one of great importance, is the labor saved and also the small expense incurred in this method of transplanting.

When the body of the transplanter is made of wood cut in thin strips, the transplanter may be left in the ground to decay; but if in practice it is found desirable, after the plant has commenced growing in the ground, the body of the transplanter may be removed in any convenient manner.

Having thus described my invention, I claim as new and desire to secure by Letters Patent—

1. A transplanter, the same consisting of a body made of perishable material and adapted to receive earth and seed, or a plant, the said body being provided with apertured sides, and a bottom having sliding and removable engagement with the body, as and for the purpose set forth.

2. A transplanter, the same consisting of a body of perishable material, such as thin wood, said body being adapted to contain earth and to receive the seed, or the plant to be transplanted, the body being provided with series of apertures in its sides, and an apertured bottom having sliding and removable engagement with the body, as and for the purpose set forth.

OTTO FREDERICK MULHAUPT.

Witnesses:
C. L. ARDIS,
JAS. J. BOOTH.